US005789105A

United States Patent [19]

Zhong et al.

[11] Patent Number: 5,789,105
[45] Date of Patent: Aug. 4, 1998

[54] USE OF $P_2O_5$ IN NON-AQUEOUS RECHARGEABLE LITHIUM BATTERIES

[75] Inventors: Qiming Zhong; Ulrich von Sacken, both of Coquitlam, Canada

[73] Assignee: Moli Energy (1990) Limited, Canada

[21] Appl. No.: 657,398

[22] Filed: Jun. 3, 1996

[30] Foreign Application Priority Data

Jun. 2, 1995 [CA] Canada ................................. 2150877

[51] Int. Cl.[6] .......................... H01M 4/62; H01M 10/40
[52] U.S. Cl. ........................... 429/188; 429/197; 429/209
[58] Field of Search .............................. 429/188, 194, 429/197, 209

[56] References Cited

U.S. PATENT DOCUMENTS 5,273,848  12/1993  Noguchi et al. ................. 429/194 X
5,474,858  12/1995  Merritt ................................. 429/57

OTHER PUBLICATIONS

Y. Sakurai, et al., "Correlation Between Microstructure and Electrochemical Behaviour of Amorphous $V_2O_5$–$P_2O_5$ in Lithium Cells", J. Electrochem. Soc., vol. 135, No. 4, Apr. 1988, p. 791.

CA and Derwent database information on European patent application No. 571,858 (May 1993).
CA and Derwent database information on Japanese laid open patent application No. 01–067869 (Mar. 1989).
Derwent and CA database information on International patent application (PCT) WO 9216026 (Sep. 1992).
CA database information on Proc. Electrochem. Soc. 91–12 (Proc. Int. Symp. Ionic Mixed Conduct. Ceram.), 145–54 (1991) (oxide sulfide glass ele) (Month unknown).
B.V.R. Chowdari, et al., "Thin Film Studies on $Li_2O$–$P_2O_5$–$Nb_2O_5$ Based Fast Ion Conducting Glasses", Solid State Ionics, 40–41, pp. 680–683 (1990) (Month Unknown).

Primary Examiner—Stephen Kalafut
Attorney, Agent, or Firm—Lerner, David, Littenberg, Krumholz & Mentlik

[57] ABSTRACT

The loss in delivered capacity as a function of the number of charge/discharge cycles in non-aqueous rechargeable lithium batteries can be reduced by exposing the electrolyte therein to $P_2O_5$. The exposure to $P_2O_5$ can be accomplished by incorporating $P_2O_5$ in either electrode or other locations that contact the electrolyte. Alternately, the electrolyte can be exposed prior to assembling the battery. The invention is particularly suited to certain lithium ion rechargeable battery electrochemistries.

33 Claims, 5 Drawing Sheets

USE OF $P_2O_5$ IN NON-AQUEOUS RECHARGEABLE LITHIUM BATTERIES

FIELD OF THE INVENTION

This invention pertains to non-aqueous rechargeable lithium batteries and to methods for improving the performance thereof. Specifically, it pertains to the use of $P_2O_5$ as means for improving the capacity delivered from lithium ion batteries after extended cycling.

BACKGROUND OF THE INVENTION

A new type of rechargeable lithium battery known as lithium-ion or 'rocking chair' has recently become available commercially and represents a preferred rechargeable power source for many consumer electronics applications. These batteries have the greatest energy density (Wh/L) of presently available conventional rechargeable systems (ie. NiCd, NiMH, or lead acid batteries). Additionally, lithium ion batteries operate around 3½ volts which is often sufficiently high such that a single cell can suffice for many electronics applications.

Lithium ion batteries use two different insertion compounds for the active cathode and anode materials. Insertion compounds are those that act as a host solid for the reversible insertion of guest atoms (in this case, lithium atoms). The excellent reversibility of this insertion makes such compounds function extremely well in rechargeable battery applications wherein thousands of battery cycles can be obtained. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with the associated electrons travelling in the circuit external to the battery. Although the insertion process is very reversible, a gradual loss of lithium and/or buildup of impedance still can occur upon extended cycling for various reasons. This in turn typically results in a gradual loss in delivered capacity with cycle number.

3.6 V lithium ion batteries based on $LiCoO_2$/pregraphitic carbon electrochemistry are now commercially available (eg. products of Sony Energy Tec. or A&T Battery). Many other lithium transition metal oxide compounds are suitable for use as the cathode material, including $LiNiO_2$ (described in U.S. Pat. No. 4,302,518) and $LiMn_2O_4$ (described in U.S. Pat. No. 4,507,371). Also, a wide range of carbonaceous compounds is suitable for use as the anode material, including coke (described in U.S. Pat. No. 4,702,977) and pure graphite (described in U.S. Pat. No. 4,423,125). The aforementioned products employ non-aqueous electrolytes comprising $LiBF_4$ or $LiPF_6$ salts and solvent mixtures of ethylene carbonate, propylene carbonate, diethyl carbonate, and the like. Again, numerous options for the choice of salts and/or solvents in such batteries are known to exist in the art.

$P_2O_5$ is a common chemical compound and its properties are well known. $P_2O_5$ is known to decompose into various hydrogen-phosphorous-oxygen containing compounds in the presence of water. $P_2O_5$ has been used extensively in the art as a reactant for preparing end components in other type lithium batteries.

For instance, the prior art contains numerous references to the use of $P_2O_5$ as a crystallization modifier in the preparation of vanadium oxide cathode compounds for lithium metal anode batteries (see for example Journal of the Electrochemical Society, Vol. 135, No. 4, April 1988, p.791, Y. Sakurai et al.). In said preparation, the $P_2O_5$ is a precursor and exists as alpha or beta $VPO_3$ in the product cathode. The prior art also contains references wherein $P_2O_5$ is used in the preparation of other cathode compounds, but again the $P_2O_5$ is substantially changed chemically during the preparation. For example, Mitsubishi Cable Industries in European patent application No. 571,858 describe the preparation of lithium-cobalt-phosphate cathode compounds and Sanyo in Japanese patent application laid-open no. 01-067869 describe the preparation of treated manganese oxide cathode compounds.

Additionally, the prior art contains references to the use of $P_2O_5$ as a reactant in the preparation of anode compounds for lithium ion batteries. For instance, Sony in International Application WO 9216026 describe the preparation of phosphorous-carbon anode compounds. Again, the reactant $P_2O_5$ is substantially modified chemically by the preparation.

Also, $P_2O_5$ has been used in the art as a precursor for the preparation of certain glassy solid electrolytes (as in the preparation of an oxide/sulfide glass described in Proc. Electrochem. Soc., 91-12 (Proc. Int. Symp. Ionic Mixed Conduct. Ceram.), 145–54 (1991) by S. Jones et al. or the preparation of an oxide glass mix described in Solid State Ionics, 40–41, p680–3 (1990) by B. Chowdari et al.).

Thus, although $P_2O_5$ has been used extensively as a reactant for end components employed in non-aqueous lithium batteries, $P_2O_5$ per se seems not to have been identified as a useful battery component or additive.

SUMMARY OF THE INVENTION

Rechargeable batteries exhibit a loss in delivered capacity as a function of the number of charge/discharge cycles. Herein, the fractional loss of capacity per cycle is referred to as the fade rate. The instant invention includes non-aqueous rechargeable lithium batteries having improved fade rates and methods for achieving the reduced fade rate. Non-aqueous rechargeable lithium batteries generally comprise a lithium insertion compound cathode, a lithium, lithium alloy or lithium insertion compound anode, and a non-aqueous electrolyte comprising a lithium salt dissolved in a non-aqueous solvent. We have discovered unexpectedly that exposing the electrolyte of such batteries to $P_2O_5$ can result in improved fade rate characteristics.

Thus, batteries of the invention can have $P_2O_5$ incorporated as a powder dispersed in the cathode, whereby it is exposed to the electrolyte. The amount of $P_2O_5$ therein can be in the range from greater than zero to about 1% by weight of the cathode. We have found that improved fade rates can be achieved for cathodes comprising a lithium transition metal oxide, in particular $LiCoO_2$. Such cathodes often additionally comprise a conductive dilutant and improved fade rates can be achieved when the conductive dilutant is filamentary carbon black or graphite. Batteries of the invention can instead have $P_2O_5$ suspended in the electrolyte. The amount of $P_2O_5$ therein can correspond to an amount in the range from greater than zero to about 1% by weight of the cathode.

Alternately, batteries of the invention can have $P_2O_5$ incorporated as a powder dispersed in the anode, whereby it is exposed to the electrolyte. The amount of $P_2O_5$ therein can be in the range from greater than zero to about 1% by weight of the anode. We have determined that improved fade rates can be achieved for anodes comprising a carbonaceous insertion compound.

As a further alternative, batteries of the invention can have $P_2O_5$ incorporated in the battery at a location in contact with the electrolyte but remote from both the cathode and the anode. The amount of $P_2O_5$ therein can be in a range equivalent to amounts that are effective in either electrode. In preferred embodiments of the invention, the cathode is typically heavier than the anode. Thus, the amount of $P_2O_5$ can range from greater than zero to about 1% by weight of the cathode.

Finally, batteries of the invention can have the component electrolyte exposed to $P_2O_5$ prior to assembling the battery. The amount of $P_2O_5$ employed in such a case can be in the range from greater than zero to about 2 grams per 100 mL of electrolyte. Improved fade rates can be achieved for electrolytes comprising $LiPF_6$ salt and/or solvent mixtures comprising ethylene carbonate, propylene carbonate, and diethyl carbonate.

In general, the method of the invention involves exposing the electrolyte of a non-aqueous rechargeable lithium battery to $P_2O_5$, which in turn can result in a reduction in the fade rate during cycling. The exposing can be accomplished in various alternative manners including: incorporating the $P_2O_5$ as a dispersed powder in either the cathode or the anode; suspending the $P_2O_5$ in the electrolyte prior to filling the battery; incorporating the $P_2O_5$ into the battery at a location in contact with the electrolyte but remote from both the cathode and the anode; or exposing the component electrolyte to the $P_2O_5$ prior to assembling the battery. In the latter instance, it may be advantageous to additionally heat the electrolyte, for example, to a temperature up to about 40° C., during the exposing.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

The fade rate characteristic of non-aqueous lithium rechargeable batteries in general can be improved by exposing the electrolyte to $P_2O_5$. Such batteries employ a lithium insertion compound as the cathode and one of a variety of lithium compounds as the anode. Possible lithium compounds include lithium metal, lithium alloys, and lithium insertion compounds. Preferred embodiments are lithium ion batteries wherein the anode is also a lithium insertion compound.

Battery design usually involves trading off capability in one area for a necessary improvement in another. Lithium ion batteries are desirably constructed with the cathode in the fully discharged states and no additional excess lithium. An irreversible loss of lithium occurs during an initial charging of such a battery. The battery is cathode limited and any loss of lithium thereafter results in a corresponding loss in battery capacity. Also, any increase in battery impedance results in a corresponding loss in delivered capacity at a given discharge rate. Thus, for optimum fade rate characteristics, it is important to prevent lithium loss and impedance buildup. Desirable fade rates can be achieved with certain battery component choices and constructions. However, for other reasons including cost reduction, safety improvement, and the like, other component and/or construction choices may be preferred. For instance, the use of $LiBF_4$ salt in such batteries may result in a more desirable fade rate while use of $LiPF_6$ salt may result in a safer, more stable electrolyte. In such circumstances, means for improving fade rate in combination with the latter salt choice may be preferred.

Various configurations are possible for the batteries of the invention (ie. prismatic formats or miniature coin cells). A preferred construction for a lithium ion type product is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Figure 1:
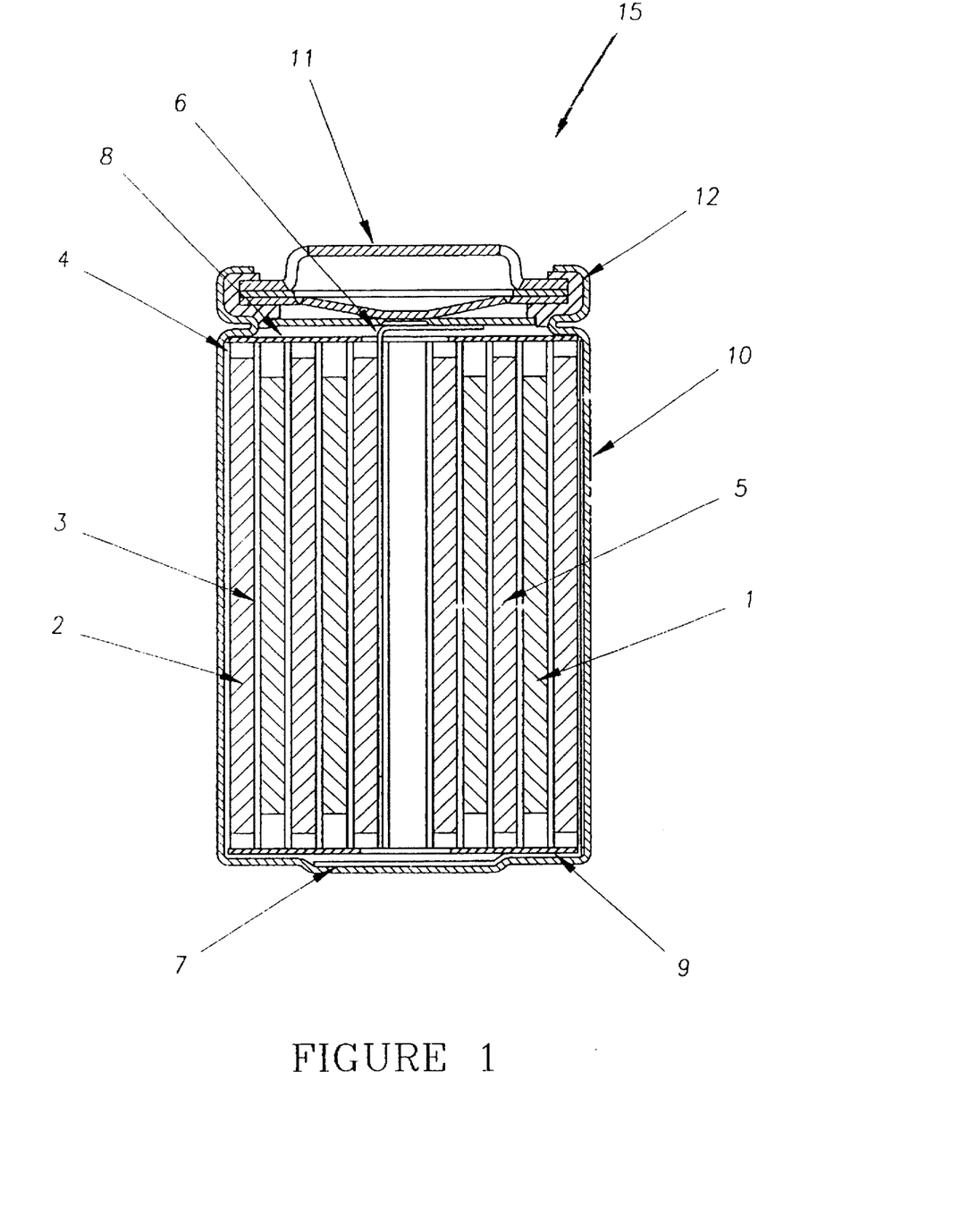
FIG. 1 depicts a cross-sectional view of a preferred embodiment of a cylindrical spiral-wound lithium ion battery.

Cathode foils are prepared by applying a mixture of a suitable powdered (about 10 micron size typically) cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include safety devices if desired. A combination safety vent and pressure operated disconnect device may be employed. FIG. 1 shows one such combination that is described in detail in Canadian Patent Application No. 2,099,657, filed Jun. 25, 1993. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, electrolyte 5 is added to fill the porous spaces in the jelly roll 4.

Lithium ion batteries of the invention additionally have the electrolyte exposed to $P_2O_5$ to improve the fade rate. The exposing step can be accomplished in a variety of ways. However, it is important to minimize the exposure of the $P_2O_5$ to water and/or water vapor in order to minimize decomposition thereof. A preferred method involves incorporating $P_2O_5$ powder in the cathode slurry prior to coating the cathode foil substrate. The $P_2O_5$ powder becomes dispersed uniformly throughout the cathode itself and is continuously exposed to the battery electrolyte after assembly.

Another preferred method involves suspending finely ground $P_2O_5$ powder in the electrolyte prior to filling the battery with the electrolyte. Relatively stable suspensions of $P_2O_5$ powder in certain electrolytes can be prepared (ie. remaining suspended for several days).

Alternately, $P_2O_5$ powder may be incorporated in the anode slurry prior to coating the anode foil substrate. Although the $P_2O_5$ is also uniformly dispersed in the battery in this manner, an overall reduction in battery capacity can occur as illustrated in the examples to follow.

In principle, $P_2O_5$ can instead be incorporated in the battery at any other location as long as it is in contact with the electrolyte. Ideally, the $P_2O_5$ is incorporated such that it is readily accessed by the entire volume of electrolyte.

Finally, the electrolyte can be exposed to $P_2O_5$ prior to assembling the battery. For instance, $P_2O_5$ powder can be added to a container of component electrolyte. It may be advantageous to heat the electrolyte during the exposing to accelerate any reactions that take place. Thereafter the exposed electrolyte is used to fill the battery in the normal way. $P_2O_5$ is not highly soluble in typical non-aqueous solvents but the exposed electrolyte can contain a small amount in solution. Additionally, while coarse $P_2O_5$ powder does settle out in liquid electrolyte, fine particulates may still remain suspended therein. Thus, such exposed electrolyte typically will have some amount of $P_2O_5$ in solution and/or suspended, thereby continuously exposing the electrolyte after assembly.

Advantages of the invention can be achieved using modest amounts of $P_2O_5$ relative to the amount of electrolyte in the exposing step. In the examples to follow, desirable results were obtained using of order of 2 grams of $P_2O_5$ per 100 grams of component electrolyte or using about 1% $P_2O_5$ additive by weight in either electrode. (These levels are roughly equivalent given the component ratios in the examples.)

$P_2O_5$ is known to decompose in the presence of water. The presence of these decomposition products may have undesirable effects on battery performance. It is desirable therefore to avoid exposing the $P_2O_5$ to wet air during handling and storage. All lithium ion battery components are typically treated in such a manner. However, the electrolyte is often the component most sensitive to water and is handled and stored accordingly. Thus, employing a method of the invention that involves incorporating the $P_2O_5$ in the electrolyte can impose the least additional burden on handling and storage procedures.

If the $P_2O_5$ is incorporated in the battery, lesser amounts are obviously preferred in order to maximize battery capacity. Additionally, high levels of $P_2O_5$ additives in the electrodes can interfere with electrical conductivity (since it is an insulator) and/or reduce the density of electrode that can be fabricated. Thus, very fine or very irregular $P_2O_5$ powders may not be desirable electrode additives. Some non-inventive empirical trials within the scope of the invention may be required in order to select appropriate $P_2O_5$ powder characteristics that avoid severe conductivity or density penalties.

At this time, the reason for the fade rate improvement using the $P_2O_5$ powder method of the invention is unclear. Without being adversely bound by theory, but in an effort to enable an understanding of the invention, a possible explanation is that the $P_2O_5$ scavenges an impurity of some kind that may be present in some lithium ion systems and not others. Alternately, the $P_2O_5$ may affect the nature of the passivation film that forms on the anode of such batteries. In such cases, the invention can be expected to pertain to any lithium battery system having similar impurities and/or passivation film chemistry. (The surface area of lithium metal anodes typically increases substantially with cycling and may attain values much greater than that of conventional lithium ion anodes. Thus, significantly greater levels of $P_2O_5$ may be required to achieve a similar effect.) It is also possible that the $P_2O_5$ used in the exposing step reacts with an electrolyte component to form other compounds which in turn scavenge impurities and/or affect the passivation film.

The following Examples are provided to illustrate certain aspects of the invention but should not be construed as limiting in any way. 18650 size cylindrical batteries (18 mm diameter, 650 mm height) were fabricated as described in the preceding and shown generally in FIG. 1. Cathodes 1 comprised a mixture of $LiCoO_2$ powder, a carbonaceous conductive dilutant, and polyvinylidene fluoride (PVDF) binder uniformly coated on both sides of a thin aluminum foil about 5.8 cm by 55 cm in dimension. Coating weight was about 35 mg/cm$^2$. Anodes 2 were made using a mixture of a spherical graphitic powder plus Super S (trademark of Ensagri) carbon black and PVDF binder (in amounts of about 2 and 10% by weight respectively to that of the spherical graphitic powder) uniformly coated on thin copper foil with dimensions to match the cathode. Coating weight was about 19 mg/cm$^2$. Both electrodes were prepared as discrete segments under ambient laboratory conditions and were exposed thereto for about 2 hours. Further assembly of the batteries was carried out in a dry rom at about 1% relative humidity. Celgard® 2400 microporous polypropylene film was used to form the separators 3. The electrolyte 5 was a solution of 1M $LiPF_6$ salt dissolved in a solvent mixture of propylene carbonate (PC), ethylene carbonate (EC), and diethyl carbonate (DEC) in a volume ratio of 20/30/70 respectively. (The electrolyte was prepared under dry conditions and was stored in sealed containers. It contains less than 50 ppm water.) Approximately 4 cc of electrolyte was used in each battery. For electrical testing, batteries were thermostatted at 21°±1° C. Cycling was performed using a current limited, constant voltage charge (1A maximum, 4.1 volts) and a constant 1 amp current discharge to a 2.5 volt cutoff. Every 20 cycles, an equivalent discharge current of 31 mA was used for purposes of determining if any observed capacity loss was recovered at a lower discharge rate, ie. if any loss in delivered capacity resulted from an impedance buildup.

Inventive Example 1

A series of 18650 batteries was constructed having 5% by weight Super S (trademark of Ensagri) carbon black conductive dilutant and varying levels of $P_2O_5$ additive in the cathode. In preparing the cathodes for this series, PVDF binder solutions were made first. Varying amounts of $P_2O_5$ powder were added next and suspended therein. Finally, a premixed $LiCoO_2$/conductive dilutant powder blend was added and coated onto foil in a conventional manner. Batteries were cycled as described above. Herein, fade rate is quantified as the % loss per hundred cycles in the delivered capacity at the 1 amp discharge rate between cycles number 320 and 20 compared to that at cycle 20. Table 1 shows the weight % of $P_2O_5$ in the cathode versus the fade rate for each battery tested (two batteries per weight % level were constructed in most cases). It is noted that the fade rate is significantly reduced in batteries having the cathode additive.

TABLE 1

% $P_2O_5$ in cathode vs. fade rate

| Weight % $P_2O_5$ in cathode | Fade rate (% loss per 100 cycles) |
|---|---|
| 0 | 5.5, 6.9 |
| 0.2 | 3.5 |
| 0.4 | 3.2, 2.9 |
| 1.0 | 2.7, 2.6 |

Figure 2:
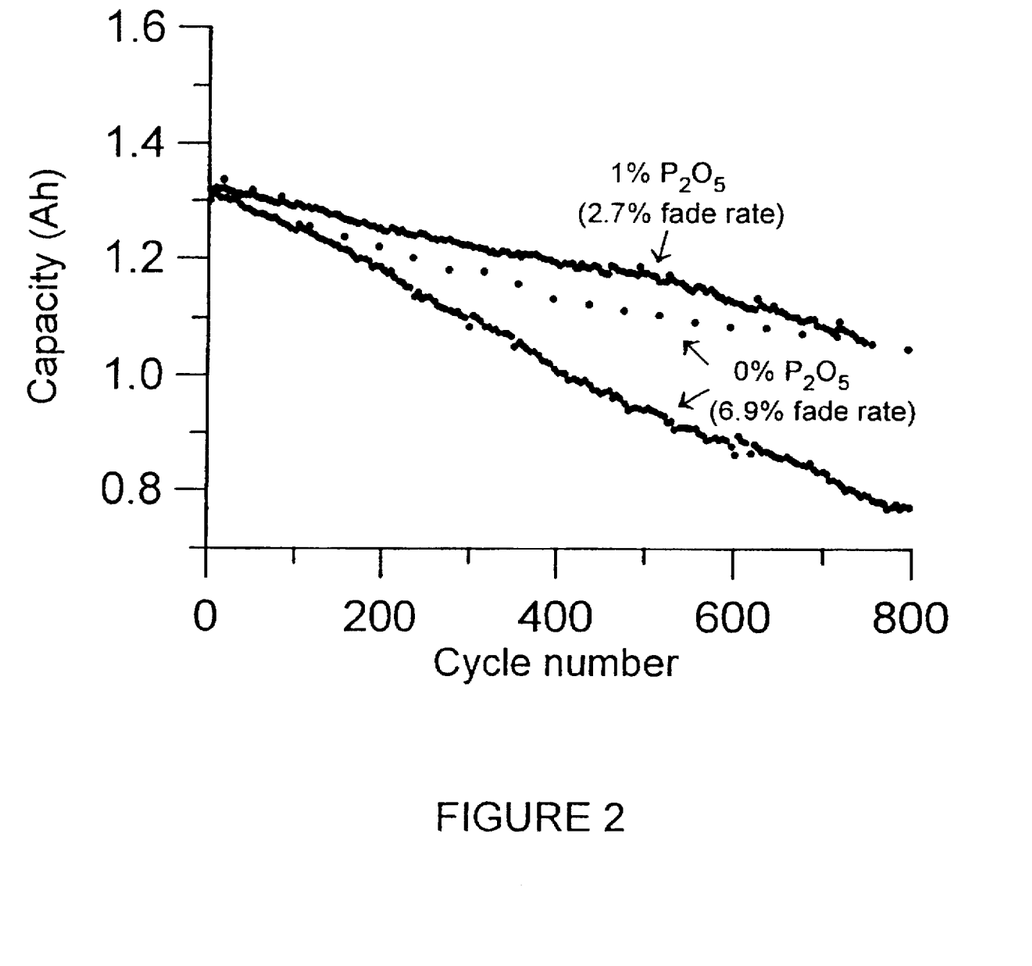
FIG. 2 shows the capacity versus cycle number data for representative batteries of Inventive Example 1 comprising respectively 0% and 1.0% $P_2O_5$ in the cathode.

FIG. 2 shows the capacity versus cycle number data for representative batteries comprising 0% and 1.0% $P_2O_5$ in the cathode. The latter shows an improved fade rate over the former. In the former, most of the capacity loss at the 1 amp discharge rate is recovered at the lower discharge rate every 20 cycles.

Figure 3A:
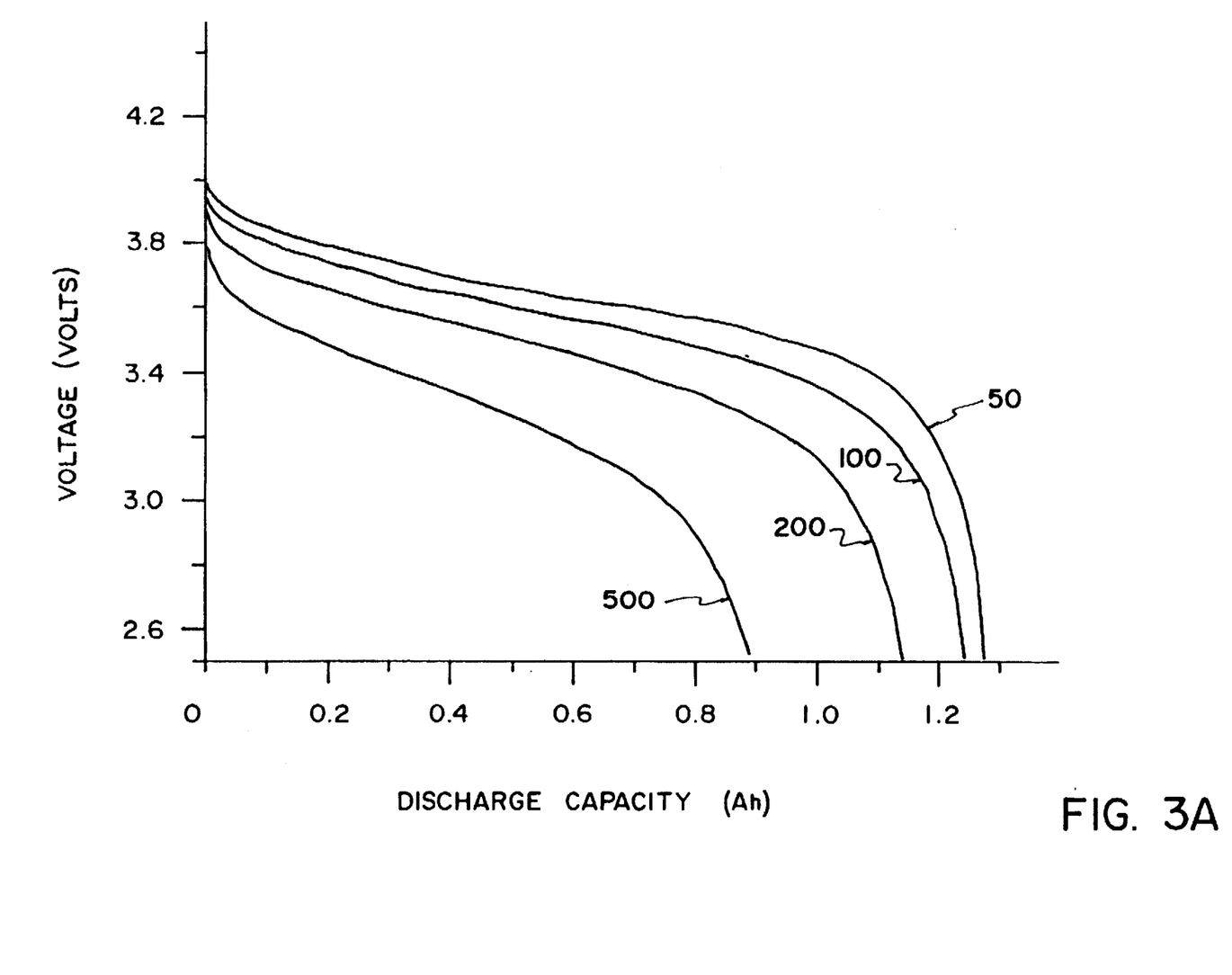
FIGS. 3a and 3b show the discharge voltage profiles for selected cycles of batteries of Inventive Example 1 comprising 0% and 1.0% $P_2O_5$ respectively in the cathode.
Figure 3B:
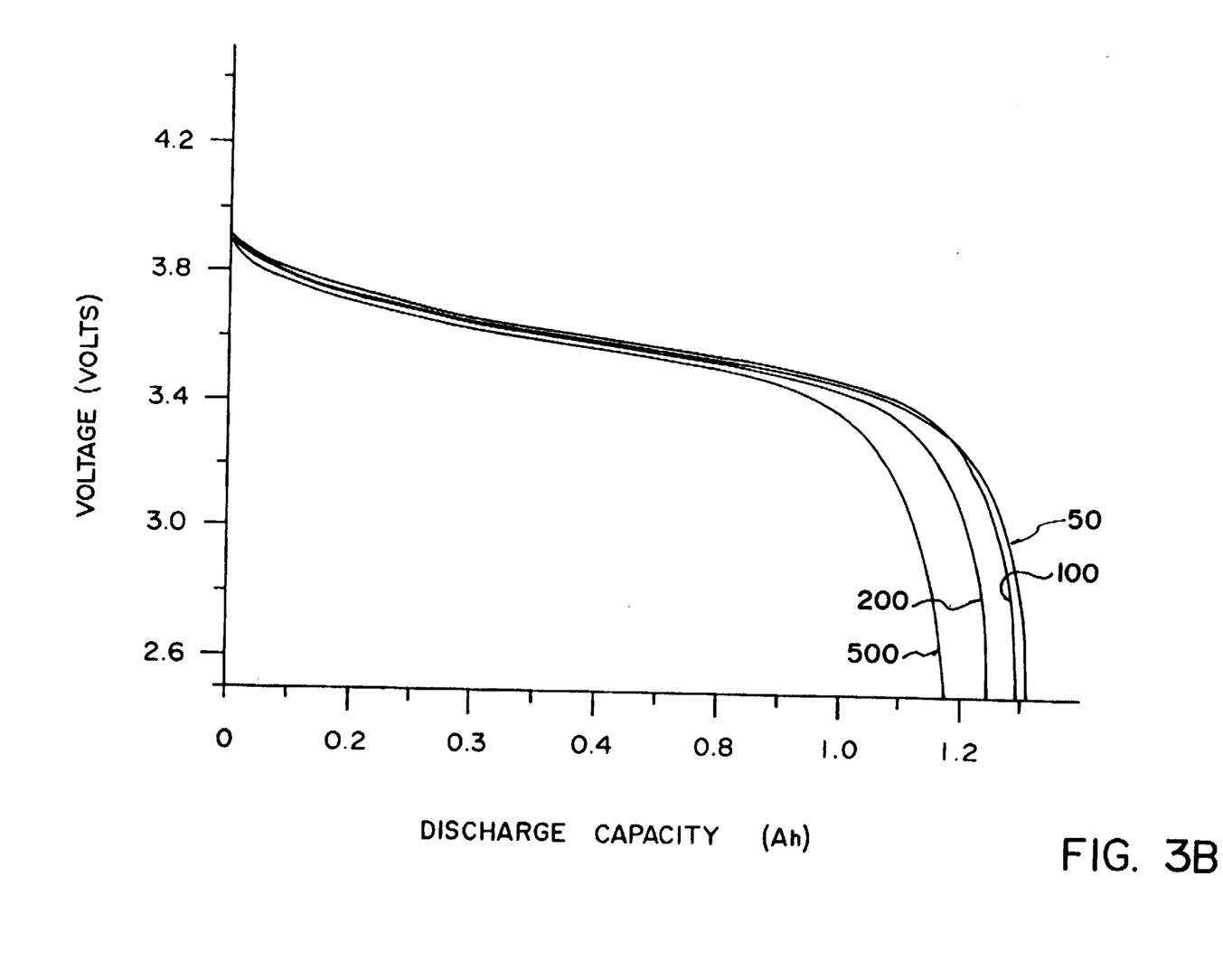

FIGS. 3a and b show the discharge voltage profiles for selected cycles of the representative batteries comprising 0% and 1.0% $P_2O_5$ respectively in the cathode. An impedance buildup is evident in the battery without $P_2O_5$ (the voltage profile in FIG. 3a is shifted with cycle number). However, there is little impedance buildup in the battery with 1.0% $P_2O_5$ in FIG. 3b.

Inventive Example 2

Batteries were fabricated and tested as in Inventive Example 1 except the cathodes comprised about 6.4% by weight of KS15 (trademark of Lonza) graphite conductive dilutant instead of a filamentary carbon black. It was noted that two conventional batteries without $P_2O_5$ additive had fade rates of 16.5 and 17%. Two batteries having 0.4% by weight of $P_2O_5$ in the cathode had fade rates of 6.0 and 5.9%. (In this example, the fade rate calculation is based on the capacity loss between cycle 120 and 20.)

Inventive Example 3

Two batteries without $P_2O_5$ in the cathode were fabricated and tested as in Inventive Example 1 except that the electrolyte was exposed to $P_2O_5$ prior to assembling the batteries. 2 grams of $P_2O_5$ was mixed with 100 cc of conventional electrolyte in a sealed vessel at room temperature and then was stored for 24 hours at 40° C. (Since about 4 cc of electrolyte is used per battery, this amount corresponds to about 80 mg per battery or about 0.8% of the weight of the cathode.) The treated electrolyte was yellow in color and some settled powder was observed in the vessel. The supernatant electrolyte was decanted manually and was used to fill the batteries of this Example. The fade rate of these batteries was found to be 3.6 and 4.9%.

Figure 4:
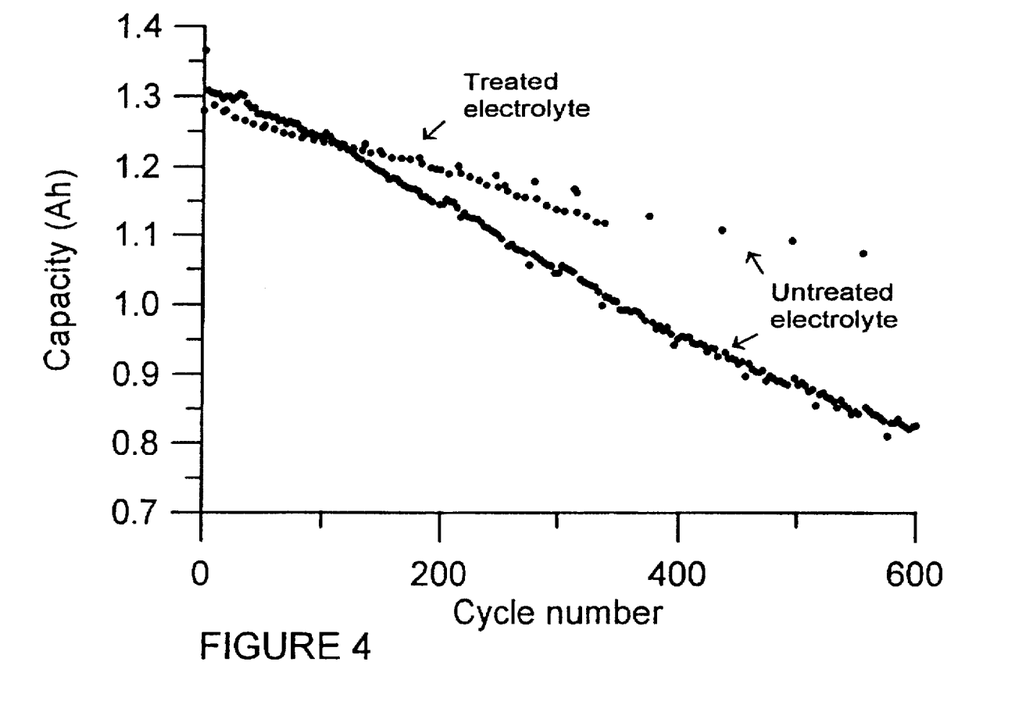
FIG. 4 shows the capacity versus cycle number data for representative batteries of Inventive Example 3 comprising untreated and treated electrolyte.

FIG. 4 shows the capacity versus cycle number data for representative batteries comprising untreated and treated electrolyte.

Inventive Example 4

Two batteries were fabricated and tested as in Inventive Example 1 except that a 1.0% level of $P_2O_5$ additive was used in the anode. (There is almost twice as much cathode as anode by weight in these batteries. This level of $P_2O_5$ corresponds in weight to about a 0.6% $P_2O_5$ level in the cathode.) In preparing the anode, PVDF binder solution was made first and an appropriate amount of $P_2O_5$ powder was added next and suspended therein. Finally, a premixed spherical graphite/filamentary carbon black powder blend was added and coated onto foil in a conventional manner. The initial capacity of these batteries was about 7% lower than batteries without additive. However, the fade rate of these batteries was found to be 5.4 and 5.6%.

Inventive Example 5

Figure 5:
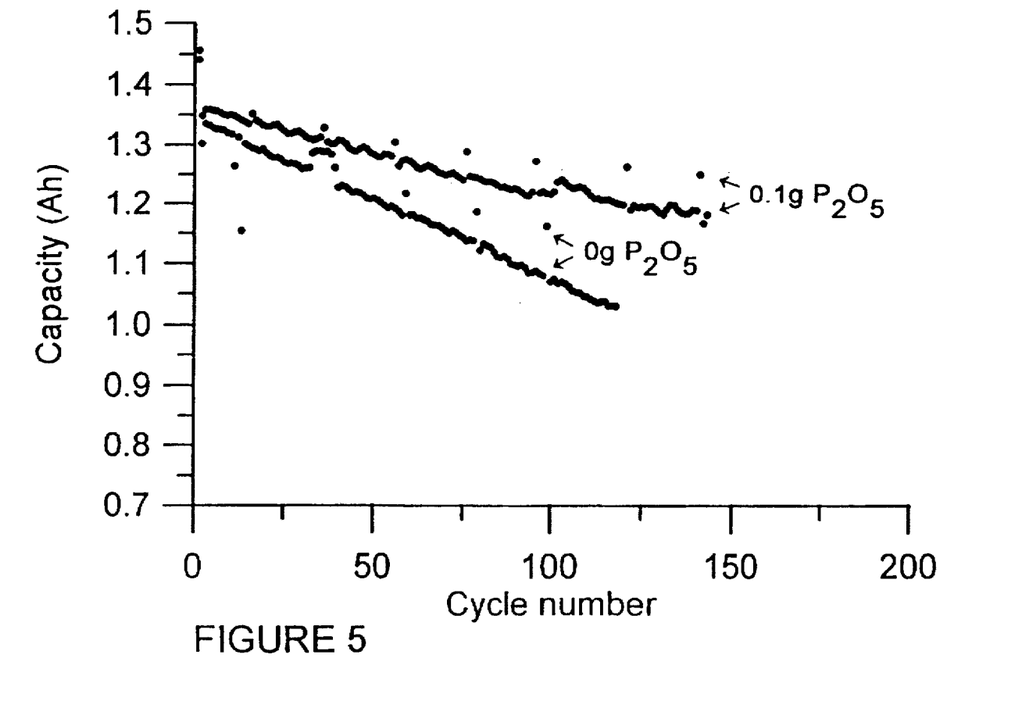
FIG. 5 shows the capacity versus cycle number data for the two batteries of Inventive Example 4 comprising 0 g and 0.1 g $P_2O_5$ respectively.

Two batteries without $P_2O_5$ in the cathode were fabricated and tested as in Inventive Example 2 except that 0.1 grams of $P_2O_5$ powder was introduced into the void at the core of the jelly roll of one battery (ie. remote from both anode and cathode) just prior to the electrolyte filling operation. FIG. 5 shows the capacity versus cycling number data for these two batteries. The batteries comprising 0.1 g and 0 g $P_2O_5$ had fade rates of 10.0% and 20.3% respectively (based on the capacity loss between cycle 120 and 20). The former battery thus shows an improvement over the latter conventional battery, but not to the same extent as found for the batteries of Inventive Example 2.

Inventive Example 6

15 grams of $P_2O_5$ was added to a bottle containing 150 cc of electrolyte similar to that used in Inventive Example 2. The mixture became cold and initially resembled sand in water. After about 30 minutes, aggregates started to form and the $P_2O_5$ had swelled such that the mixture resembled a gel. Media was then added and the bottle was tumbled for about a day thereby grinding the $P_2O_5$ into a fine powder. This concentrated suspension was diluted thereafter by a factor of 4 using additional electrolyte (ie. about 0.1 grams $P_2O_5$ per 4 cc suspension). The freshly made suspension resembled milk and remained suspended for about a day, after which some precipitate was noticed. The suspension was then resuspended using an ultrasonic bath after which it remained suspended for more than three days.

Batteries similar to those in Inventive Example 2 but without $P_2O_5$ in the cathode were fabricated using the suspension and are currently undergoing testing.

The preceding Examples show that improved fade rates can be achieved in certain lithium ion battery constructions. However, incorporating $P_2O_5$ in the anode appears to result in an undesirable initial loss in overall capacity. The reason for this loss is not fully understood, but in some manner (perhaps a reaction of lithium directly with the $P_2O_5$ in the anode), additional lithium is consumed on the initial charge of the battery.

Illustrative Example 1

Two batteries were fabricated as in Inventive Example 2 except that a 1% level of $P_2O_5$ additive was used in the cathode. The initial impedance of these batteries was very high and the delivered capacities were low, being about half of that of batteries without additive. The extra additive in cathode comprising graphite conductive dilutant appears to substantially affect the cathode conductivity.

Illustrative Example 2

Two batteries having $P_2O_5$ in the cathode were fabricated and tested as in Inventive Example 2 except that the cathode was prepared in a larger continuous batch. The cathode was exposed to ambient laboratory type conditions for about 7 hours. The batteries were then cycled and had fade rates of about 70% (based on the capacity loss between cycle 120 and 20). These batteries show drastically worse fade rates (worse than conventional batteries). The cathode, however, was exposed to "wet" air for about 3½ times longer than that in inventive Example 2.

Illustrative Example 3

Two batteries without $P_2O_5$ in the cathode were fabricated and tested as in Inventive Example 2 except that $H_3PO_4$ (a product of the decomposition of $P_2O_5$ in water or "wet" air) was added to the electrolyte in an amount equivalent to 0.1 grams per battery. The batteries showed a very high impedance at the start of testing. Gas pressure in the batteries built up sufficiently during the initial charge to activate pressure relief vents thereby ending the test after only about 30% of the normal charge was passed. The presence of $H_3PO_4$ is clearly detrimental to battery performance.

The latter two examples suggest the prolonged exposure of $P_2O_5$ to "wet" air or water is detrimental to the method of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A non-aqueous rechargeable lithium battery comprising:

a lithium insertion compound cathode;

a lithium, lithium alloy or lithium insertion compound anode; and a non-aqueous electrolyte comprising a lithium salt dissolved in a non-aqueous solvent wherein the electrolyte is exposed to $P_2O_5$, by suspending the $P_2O_5$ in the electrolyte, by dispersing the $P_2O_5$ as a powder in the anode, by incorporating the $P_2O_5$ in the battery at a location in contact with the electrolyte but remote from both cathode and anode, or by exposing the electrolyte to the $P_2O_5$ prior to assembling the battery, whereby the fade rate of the battery during cycling is reduced compared to a lithium battery which does not have an electrolyte exposed to $P_2O_5$.

2. A battery as claimed in claim 1 wherein the cathode comprises a lithium transition metal oxide.

3. A battery as claimed in claim 2 wherein the lithium transition metal oxide is $LiCoO_2$.

4. A battery as claimed in claim 2 wherein the cathode additionally comprises a conductive dilutant.

5. A battery as claimed in claim 4 wherein the conductive dilutant is filamentary carbon black.

6. A battery as claimed in claim 4 wherein the conductive dilutant is graphite.

7. A battery as claimed in claim 1 wherein the $P_2O_5$ is suspended in the electrolyte.

8. A battery as claimed in claim 7 wherein the amount of $P_2O_5$ is in the range from greater than zero to about 1% by weight of the cathode.

9. A battery as claimed in claim 1 wherein the $P_2O_5$ is incorporated as a dispersed powder in the anode.

10. A battery as claimed in claim 9 wherein the amount of $P_2O_5$ is in the range from greater than zero to about 1% by weight of the anode.

11. A battery as claimed in claim 9 wherein the anode comprises a carbonaceous insertion compound.

12. A battery as claimed in claim 1 wherein the $P_2O_5$ is incorporated in the battery at a location in contact with the electrolyte but remote from both cathode and anode.

13. A battery as claimed in claim 12 wherein the amount of $P_2O_5$ is in the range from greater than zero to about 1% by weight of the cathode.

14. A battery as claimed in claim 1 wherein the electrolyte is exposed to the $P_2O_5$ prior to assembling the battery.

15. A battery as claimed in claim 14 wherein the amount of $P_2O_5$ is in the range from greater than zero to about 2 grams per 100 mL of electrolyte.

16. A battery as claimed in claim 1 wherein the lithium salt is $LiPF_6$.

17. A battery as claimed in claim 1 wherein the non-aqueous solvent is a mixture of ethylene carbonate, propylene carbonate, and diethyl carbonate.

18. A method for reducing the fade rate during cycling of a non-aqueous rechargeable lithium battery, the battery having a lithium insertion compound cathode, a lithium, lithium alloy or lithium insertion compound anode, and a non-aqueous electrolyte comprising a lithium salt dissolved in a non-aqueous solvent, which comprises exposing the electrolyte to $P_2O_5$, by suspending the $P_2O_5$ in the electrolyte, by dispersing the $P_2O_5$ as a powder in the anode, by incorporating the $P_2O_5$ in the battery at a location in contact with the electrolyte but remote from both cathode and anode, or by exposing the electrolyte to the $P_2O_5$ prior to assembling the battery, whereby the fade rate of the battery during cycling is reduced compared to a lithium battery which does not have an electrolyte exposed to $P_2O_5$.

19. A method as claimed in claim 18 wherein the exposing comprises suspending the $P_2O_5$ in the electrolyte prior to filling the battery.

20. A method as claimed in claim 19 wherein the amount of $P_2O_5$ is in the range from greater than zero to about 1% by weight of the cathode.

21. A method as claimed in claim 18 wherein the exposing comprises incorporating the $P_2O_5$ as a dispersed powder in the anode.

22. A method as claimed in claim 21 wherein the amount of $P_2O_5$ is in the range from greater than zero to about 1% by weight of the anode.

23. A method as claimed in claim 18 wherein the electrolyte exposing comprises incorporating the $P_2O_5$ into the battery at a location in contact with the electrolyte but remote from both cathode and anode.

24. A method as claimed in claim 23 wherein the amount of $P_2O_5$ is in the range from greater than zero to about 1% by weight of the cathode.

25. A method as claimed in claim 18 wherein the exposing of the electrolyte to the $P_2O_5$ is performed prior to assembling the battery.

26. A method as claimed in claim 25 wherein the amount of $P_2O_5$ is in the range from greater than zero to about 2 grams per 100 mL of electrolyte.

27. A method as claimed in claim 25 additionally comprising heating the electrolyte at a temperature up to about 40° C. during the exposing.

28. A non-aqueous rechargeable lithium battery comprising:

a lithium insertion compound cathode;

a carbonaceous insertion compound anode; and a non-aqueous electrolyte comprising a lithium salt dissolved in a non-aqueous solvent wherein the electrolyte is exposed to $P_2O_5$, by suspending the $P_2O_5$ in the electrolyte, by dispersing the $P_2O_5$ as a powder in the anode, by dispersing the $P_2O_5$ as a powder in the cathode, by incorporating the $P_2O_5$ in the battery at a location in contact with the electrolyte but remote from both cathode and anode, or by exposing the electrolyte to the $P_2O_5$ prior to assembling the battery, whereby the fade rate of the battery during cycling is reduced compared to a lithium battery which does not have an electrolyte exposed to $P_2O_5$.

29. A non-aqueous rechargeable lithium battery comprising:

a lithium transition metal oxide cathode;

a lithium, lithium alloy or lithium insertion compound anode; and a non-aqueous electrolyte comprising a lithium salt dissolved in a non-aqueous solvent wherein the electrolyte is exposed to $P_2O_5$, by suspending the $P_2O_5$ in the electrolyte, by dispersing the $P_2O_5$ as a powder in the anode, by dispersing the $P_2O_5$ as a powder in the cathode, by incorporating the $P_2O_5$ in the battery at a location in contact with the electrolyte but remote from both the cathode and anode, or by exposing the electrolyte to the $P_2O_5$ prior to assembling the battery, whereby the fade rate of the battery during cycling is reduced compared to a lithium battery which does not have an electrolyte exposed to $P_2O_5$.

30. A method for reducing the fade rate during cycling of a non-aqueous rechargeable lithium battery, the battery having a lithium insertion compound cathode, a carbonaceous insertion compound anode, and a non-aqueous electrolyte comprising a lithium salt dissolved in a non-aqueous solvent, which comprises exposing the electrolyte to $P_2O_5$ by suspending the $P_2O_5$ in the electrolyte, by dispersing the $P_2O_5$ as a powder in the anode, by dispersing the $P_2O_5$ as a powder in the cathode, by incorporating the $P_2O_5$ in the battery at a location in contact with the electrolyte but remote from both cathode and anode, or by exposing the electrolyte to the $P_2O_5$ prior to assembling the battery, whereby the fade rate of the battery during cycling is reduced compared to a lithium battery which does not have an electrolyte exposed to $P_2O_5$.

31. A method for reducing the fade rate during cycling of a non-aqueous rechargeable lithium battery, the battery having a lithiated transition metal oxide cathode, a lithium, lithium alloy or lithium insertion compound anode, and a non-aqueous electrolyte comprising a lithium salt dissolved in a non-aqueous solvent, which comprises exposing the electrolyte to $P_2O_5$ by suspending the $P_2O_5$ in the electrolyte, by dispersing the $P_2O_5$ as a powder in the anode, by dispersing the $P_2O_5$ as a powder in the cathode, by incorporating the $P_2O_5$ in the battery at a location in contact with the electrolyte but remote from both cathode and anode, or by exposing the electrolyte to the $P_2O_5$ prior to assembling the battery, whereby the fade rate of the battery during cycling is reduced compared to a lithium battery which does not have an electrolyte exposed to $P_2O_5$.

32. A non-aqueous rechargeable lithium battery comprising:

a lithium insertion compound cathode;

a lithium, lithium alloy or lithium insertion compound anode; and a non-aqueous electrolyte comprising a lithium salt dissolved in a non-aqueous solvent wherein the electrolyte is exposed to $P_2O_5$ by suspending the $P_2O_5$ in the electrolyte, by dispersing the $P_2O_5$ as a powder in the anode, by dispersing the $P_2O_5$ as a powder in the cathode, by incorporating the $P_2O_5$ in the battery at a location in contact with the electrolyte but remote from both cathode and anode, whereby exposing the electrolyte to the $P_2O_5$ prior to assembling the battery, whereby the fade rate of the battery during cycling is reduced compared to a lithium battery which does not have an electrolyte exposed to $P_2O_5$.

33. A method for reducing the fade rate during cycling of a non-aqueous rechargeable lithium battery, the battery having a lithium insertion compound cathode, a lithium, lithium alloy or lithium insertion compound anode, and a non-aqueous electrolyte comprising a lithium salt dissolved in a non-aqueous solvent, which comprises exposing the electrolyte to $P_2O_5$ by suspending the $P_2O_5$ in the electrolyte, by dispersing the $P_2O_5$ as a powder in the anode, by dispersing the $P_2O_5$ as a powder in the cathode, by incorporating the $P_2O_5$ in the battery at a location in contact with the electrolyte but remote from both cathode and anode, whereby exposing the electrolyte to the $P_2O_5$ prior to assembling the battery, whereby the fade rate of the battery during cycling is reduced compared to a lithium battery which does not have an electrolyte exposed to $P_2O_5$.

* * * * *